(12) United States Patent
Koseki et al.

(10) Patent No.: US 7,910,856 B2
(45) Date of Patent: Mar. 22, 2011

(54) HYBRID LASER PROCESSING APPARATUS

(75) Inventors: Ryoji Koseki, Ishikawa-Ken (JP); Motoi Sasaki, Ishikawa-Ken (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 527 days.

(21) Appl. No.: 11/988,915

(22) PCT Filed: Jul. 11, 2006

(86) PCT No.: PCT/JP2006/313752
§ 371 (c)(1),
(2), (4) Date: Jan. 15, 2008

(87) PCT Pub. No.: WO2007/023621
PCT Pub. Date: Mar. 1, 2007

(65) Prior Publication Data
US 2010/0108648 A1 May 6, 2010

(30) Foreign Application Priority Data
Aug. 25, 2005 (JP) .................. 2005-243726

(51) Int. Cl.
B23K 26/14 (2006.01)
B23K 26/36 (2006.01)
(52) U.S. Cl. .................. 219/121.67; 219/121.84; 134/1; 83/53
(58) Field of Classification Search ............ 219/121.67–121.72, 121.84; 134/1; 83/53, 177
See application file for complete search history.

(56) References Cited

U.S. PATENT DOCUMENTS

| | | | | |
|---|---|---|---|---|
| 4,497,692 A * | 2/1985 | Gelchinski et al. | ............. | 205/92 |
| 4,689,467 A * | 8/1987 | Inoue | .......................... | 219/121.6 |
| 5,068,513 A * | 11/1991 | Gangemi | .................. | 219/121.67 |
| 5,356,081 A * | 10/1994 | Sellar | ................................ | 241/1 |
| 5,773,791 A * | 6/1998 | Kuykendal | ............... | 219/121.84 |
| 5,902,499 A * | 5/1999 | Richerzhagen | ........... | 219/121.84 |
| 6,001,219 A * | 12/1999 | Caspar | .......................... | 162/286 |
| 6,777,647 B1 * | 8/2004 | Messal et al. | ............. | 219/121.84 |
| 7,807,943 B2 * | 10/2010 | Fukushima | .............. | 219/121.69 |
| 2004/0004063 A1 * | 1/2004 | Merdan | ..................... | 219/121.67 |
| 2004/0197433 A1 | 10/2004 | Terada et al. | | |
| 2009/0045177 A1 * | 2/2009 | Koseki et al. | ............. | 219/121.67 |

FOREIGN PATENT DOCUMENTS

DE 101 13 475 A1 9/2002

(Continued)

*Primary Examiner* — Samuel M Heinrich
(74) *Attorney, Agent, or Firm* — Flynn, Thiel, Boutell & Tanis, P.C.

(57) ABSTRACT

A processing table 3 holding a workpiece 2 is accommodated in a chamber 4 with a gas-tight condition kept, and a liquid column W is jetted to an upper surface of this chamber 4, and a processing head 9 that guides laser beam L to the liquid column W is secured to the upper surface of this chamber 4. An oil-sealed rotary pump 11 and a diffusion pump 12 provided in parallel are connected to the chamber 4, and the diffusion pump 12 is actuated after the actuation of the oil-sealed rotary pump 11, bringing the inside of the chamber 4 into a vacuum state.

No gas currents are generated around the liquid column W jetted from the processing head 9, making it possible to prevent turbulence of the liquid column W due to turbulence of the gas currents and enabling a liquid column having a small diameter to be jetted in a stable state.

2 Claims, 2 Drawing Sheets

FOREIGN PATENT DOCUMENTS

| | | |
|---|---|---|
| JP | 60-223694 | 11/1985 |
| JP | 64-064799 | 3/1989 |
| JP | 02-232199 | 9/1990 |
| JP | 03-178800 | 8/1991 |
| JP | 04-201200 | 7/1992 |
| JP | 06-297180 | 10/1994 |
| JP | 10-500903 | 1/1998 |
| JP | 2001-321977 | 11/2001 |

* cited by examiner

HYBRID LASER PROCESSING APPARATUS

TECHNICAL FIELD

The present invention relates to a hybrid laser processing apparatus, and more specifically relates to a hybrid laser processing apparatus that jets a liquid from a jet hole to the outside in the form of a liquid column, and guides a laser beam to the liquid column.

BACKGROUND ART

Conventionally, a hybrid laser processing apparatus including a processing head having a jet hole, liquid supply means for supplying the processing head with a high-pressure liquid, and a laser oscillator that oscillates a laser beam, the apparatus performing processing on a workpiece by jetting the liquid supplied from the liquid supply means from the jet hole to the outside in the form of a liquid column and guiding the laser beam to the liquid column has been known. (Patent Document 1)

In such a hybrid laser processing apparatus, in order to guide the laser beam in a liquid column to a workpiece, it is necessary to bring the jetted liquid column to the workpiece in a stable condition without diffusion, and also, there has been the demand to make the diameter of the jetted liquid column as small as possible from the viewpoint of yield enhancement, etc.

Patent Document 1: National Publication of International Patent Application No. 10-500903

DISCLOSURE OF THE INVENTION

Issues to be Solved by the Invention

Here, the smaller the diameter of the liquid column, the more the liquid column is disturbed by air currents generated around the liquid column, resulting in the length of the liquid column that can be kept in a stable state without diffusion being shortened. Accordingly, there is a problem in that the diameter of the liquid column cannot be reduced to a desired diameter.

In view of such a problem, the present invention is intended to provide a hybrid laser processing apparatus capable of providing a liquid column with a small diameter.

Means to Solve the Issues

In other words, a hybrid laser processing apparatus according to the present invention provides a hybrid laser processing apparatus including a processing head having a jet hole, liquid supply means for supplying the processing head with a high-pressure liquid, and a laser oscillator that oscillates a laser beam, the apparatus performing processing on a workpiece by jetting the liquid supplied from the liquid supply means from the jet hole to the outside in the form of a liquid column and guiding the laser beam to the liquid column, characterized by comprising: a chamber that encloses at least a space formed between the processing head and the workpiece; and gas exhaust means for bringing the inside of the chamber into a vacuum state.

According to the present invention, it is possible to bring the inside of the chamber into a vacuum state using the gas exhaust means, preventing the generation of air currents around the jetted liquid column and, accordingly, the liquid column will not be disturbed by the air currents, so that even a liquid column having a small diameter can be kept in a stable state for a long time.

Figure 1:
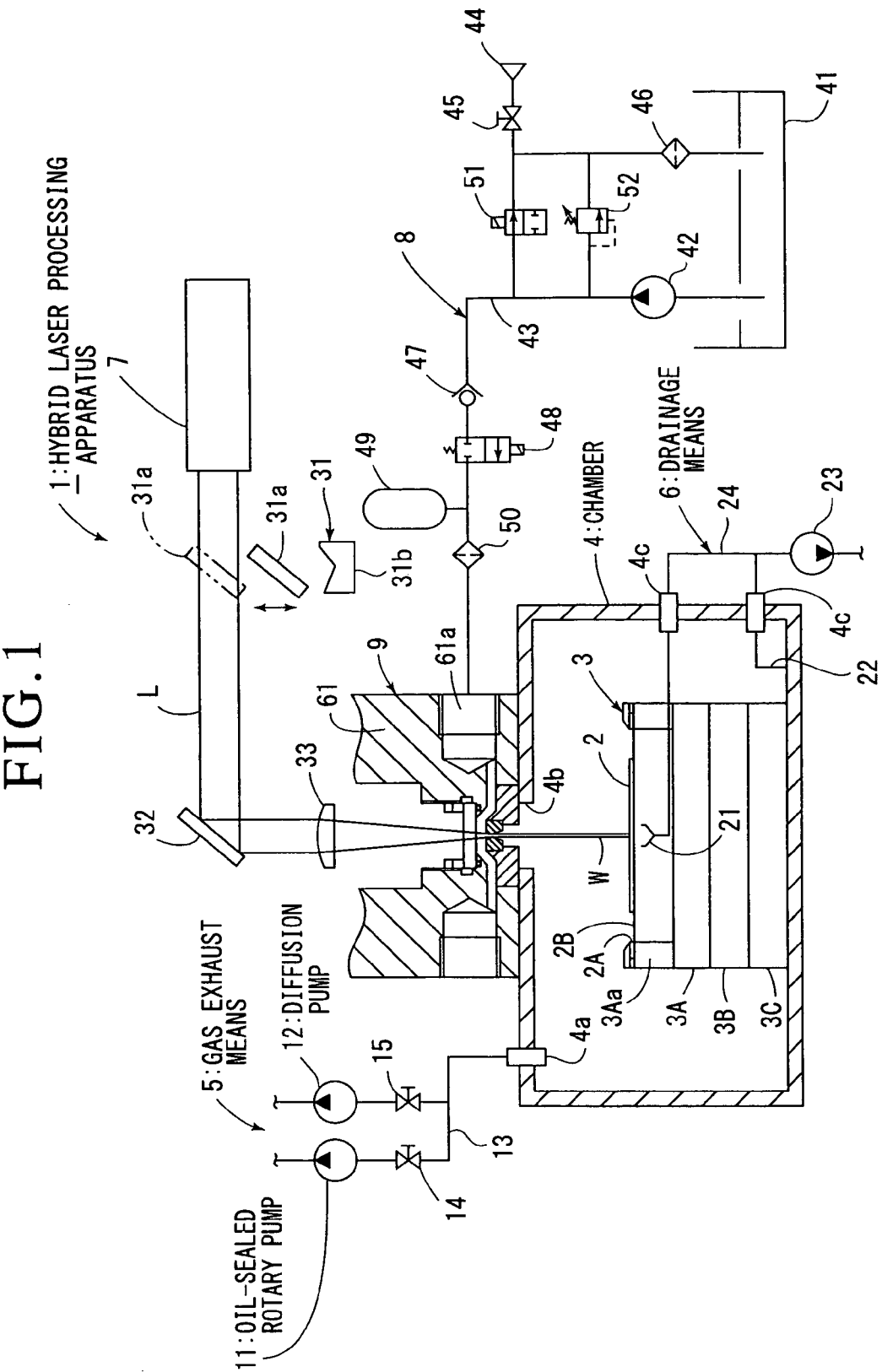
FIG. 1 is an arrangement drawing of a hybrid laser processing apparatus according to this embodiment.

DESCRIPTION OF SYMBOLS 1 hybrid laser processing apparatus
2 workpiece
3 processing table
4 chamber
5 gas exhaust means
6 drainage means
7 laser oscillator
8 liquid supply means
9 processing head
11 oil-sealed rotary pump
12 diffusion pump
21 catcher
62 jet nozzle
L laser beam
W liquid column

BEST MODE FOR CARRYING OUT THE INVENTION

Hereinafter, description will now be given of an embodiment shown in the drawings. FIG. 1 shows a hybrid laser processing apparatus 1 according to the present invention, which cuts a workpiece 2 into a required shape by guiding a laser beam L to a liquid column W formed by jetting water as a liquid.

This hybrid laser processing apparatus 1 includes: a processing table 3 holding the workpiece 2; a chamber 4 accommodating the processing table 3; gas exhaust means 5 for bringing the inside of the chamber 4 into a vacuum state; drainage means 6 for draining water in the chamber; a laser oscillator 7 that oscillates the laser beam L; liquid supply means 8 for supplying high-pressure water; and a processing head 9 that jets water toward the workpiece 2 in the form of a liquid column W and guides the laser beam L to the liquid column W, and they are controlled by controlling means not shown.

This embodiment is constructed so that it cuts a thin semiconductor wafer as the workpiece 2, and it can also cut an epoxy resin board or a composite material consisting of resin and metal, etc. Also, it is possible to perform the processing for providing a groove on a surface of the workpiece 2, in addition to processing for cutting or drilling the workpiece 2.

The processing table 3 holds the workpiece 2 in such a manner that the workpiece 2 can move in horizontal and vertical directions, and it includes an x-axis table 3A that moves the workpiece 2 in a horizontal x-axis direction, and a y-axis table 3B, provided below the x-axis table 3A, that moves in a y-axis direction perpendicular to the x-axis direction, and a z-axis table 3C that moves the x-axis and y-axis tables 3A and 3B in a vertical direction.

Here, when cutting a semiconductor wafer as the workpiece 2, the semiconductor wafer is attached to an adhesive sheet 2B that transmits the laser beam L and the liquid, and this adhesive sheet 2B is extended on a wafer ring 2A.

By fixing this wafer ring 2A to a wafer ring supporting portion 3Aa provided on an upper surface of the processing table 3, the semiconductor wafer is set on the processing table 3, and the semiconductor wafer is carried in/out to/from the processing table 3 together with the wafer ring 2A.

Since such a processing table 3 is conventionally known, a detailed description thereof will be omitted, and this processing table 3 may be provided with an angle adjustment mechanism that changes a relative angle between the processing head 9 and the workpiece 2.

The aforementioned chamber 4 forms an enclosed space where a gas-tight condition is kept against the external space, and accommodates the processing table 3 inside. Also, this chamber 4 is provided with a door, not shown, for setting the workpiece 2 on the processing table 3.

Furthermore, on an upper surface of the chamber 4, a gas exhaust hole 4a to which the gas exhaust means 5 is connected is provided, at a location where the processing head 9 is secured, a through hole 4b allowing the liquid column W to pass through is provided, and at a lower portion of the chamber 4, two drainage holes 4c to which the drainage means 6 is connected are provided.

The gas exhaust means 5 has a configuration in which an oil-sealed rotary pump 11 as a vacuum pump, and a diffusion pump 12 are provided in parallel, and these oil-sealed rotary pump 11 and diffusion pump 12 are connected to the gas exhaust hole 4a provided in the chamber 4 via a conduit 13 that forks on its way.

These oil-sealed rotary pump 11 and diffusion pump 12 are respectively controlled by the controlling means, and first and second electromagnetic valves 14, 15, which are controlled by the controlling means, are provided for the pumps 11, 12, respectively.

In this embodiment, first, the oil-sealed rotary pump 11 is actuated to bring the inside of the chamber 4 into a certain degree of a vacuum state, then, the diffusion pump 12 is actuated to further bring the inside of the chamber 4 into a higher degree of a vacuum state.

Since the oil-sealed rotary pump 11 and diffusion pump 12 are conventionally known, the detailed description of their configurations is omitted, but the oil-sealed rotary pump 11 can be used even when an exhausted gas contains a large amount of moisture, and the diffusion pump 12 is a pump preferable for further bringing the inside of the chamber 4, which has been in a certain degree of a vacuum state by means of the oil-sealed rotary pump 11, into a higher degree of a vacuum state.

Also, a vacuum pump, such as a turbo-molecular pump or an ion pump, can be used instead of the diffusion pump 12.

The drainage means 6 includes: a catcher 21 provided at the position where the liquid column W is jetted, a drain. 22 provided at a bottom portion of the chamber 4; and a drainage pump 23 provided outside the chamber 4, and the catcher 21 and the drain 22 are connected by a conduit 24 to the drainage pump 23 via the drainage holes 4c formed in the chamber 4.

The catcher 21 is provided below the workpiece 2 and the adhesive sheet 2B, and is movable relative to the processing table 3 so as not to be displaced from the position where liquid column W is jetted, and it receives water passing through the workpiece 2 and the adhesive sheet 2B.

The drain 22 aspirates water accumulated at the bottom portion of the chamber 4 as a result of, for example, bouncing off a surface of the workpiece 2, and a tip of the drain 22 is positioned at a bottom surface of the chamber 4.

The drainage pump 23 is controlled by the controlling means, and as a result of actuating this drainage pump 23, water in the chamber 4 is forcibly drained via the catcher 21 and the drain 22, reducing the amount of moisture in the chamber 4 as much as possible.

The laser oscillator 7 is a YAG laser oscillator, and it can perform CW oscillation or pulse oscillation depending on the processing, and its processing conditions, such as its output or pulse oscillation cycle, may arbitrarily be adjusted.

Between the laser oscillator 7 and the processing head 9, shutter means 31 that blocks the laser beam L, a reflective mirror 32 that reflects the laser beam L toward the processing head 9, and a condensing lens 33 that condenses the applied laser beam L are provided.

The shutter means 31 is controlled by the controlling means, and it includes a reflective mirror 31a that moves from/to the optical path of the laser beam L to/from the outside of the optical path by means of driving means not shown, and a damper 31b that absorbs the energy of the laser beam L reflected by the reflective mirror 31a.

When the reflective mirror 31a is positioned on the optical path of the laser beam L, the laser beam L is reflected on the reflective mirror 31a, and the energy of the laser beam L is absorbed by the damper 31b.

Meanwhile, when the reflective mirror 31a is moved to the outside of the optical path of the laser beam L, the laser beam L is reflected on the reflective mirror 32, and then is provided to the processing head 9 via the condensing lens 33.

As the laser oscillator 7, a semiconductor laser or a $CO_2$ laser oscillator, etc., can also be used, and if the laser beam L oscillated has a wavelength that is easily absorbed by water, such as that oscillated by a $CO_2$ laser oscillator, a liquid that poorly absorbs the laser beam L may be used for the liquid jetted by the processing head 9.

The liquid supply means 8 includes a water storage tank 41 that stores water, and a liquid-sending pump 42 that sends the water stored in the water storage tank 41 toward the processing head 9 at a high pressure, which are interconnected via a conduit 43.

The water storage tank 41 is connected to a water supply source 44, and the conduit 43 connecting the water supply source 44 and the water storage tank 41 includes an on-off valve 45 that controls water supply from the water supply source 44, and a filter 46 that removes foreign substances contained in the water supplied from the water supply source 44.

Between the liquid-sending pump 42 and the processing head 9, a check valve 47 that prevents flowing water back to the liquid-sending pump 42, a third electromagnetic valve 48, the opening/closing of which is controlled by the controlling means, an accumulator 49 that prevents the pulsation of the water sent and supplies high-pressure water to the processing head 9, and a filter 50 that removes foreign substances in the water are provided in this order from the upstream liquid-sending pump 42 side.

Also, the conduit 43 from the water supply source 44 to the water storage tank 41 and the conduit 43 from the liquid-sending pump 42 to the processing head 9 are connected via two parallel conduits 43, and one of the conduits 43 is provided with a fourth electromagnetic valve 51, and the other conduit 43 is provided with a pressure adjustment valve 52.

The fourth electromagnetic valve 51 is used to return water from the liquid-sending pump 42 to the water storage tank 41 when, for example, stopping the hybrid laser processing apparatus 1, and the pressure adjustment valve 52 is provided to maintain the pressure of the inside of the conduit 43 from the liquid-sending pump 42 to the processing head 9 to be constant.

Figure 2:
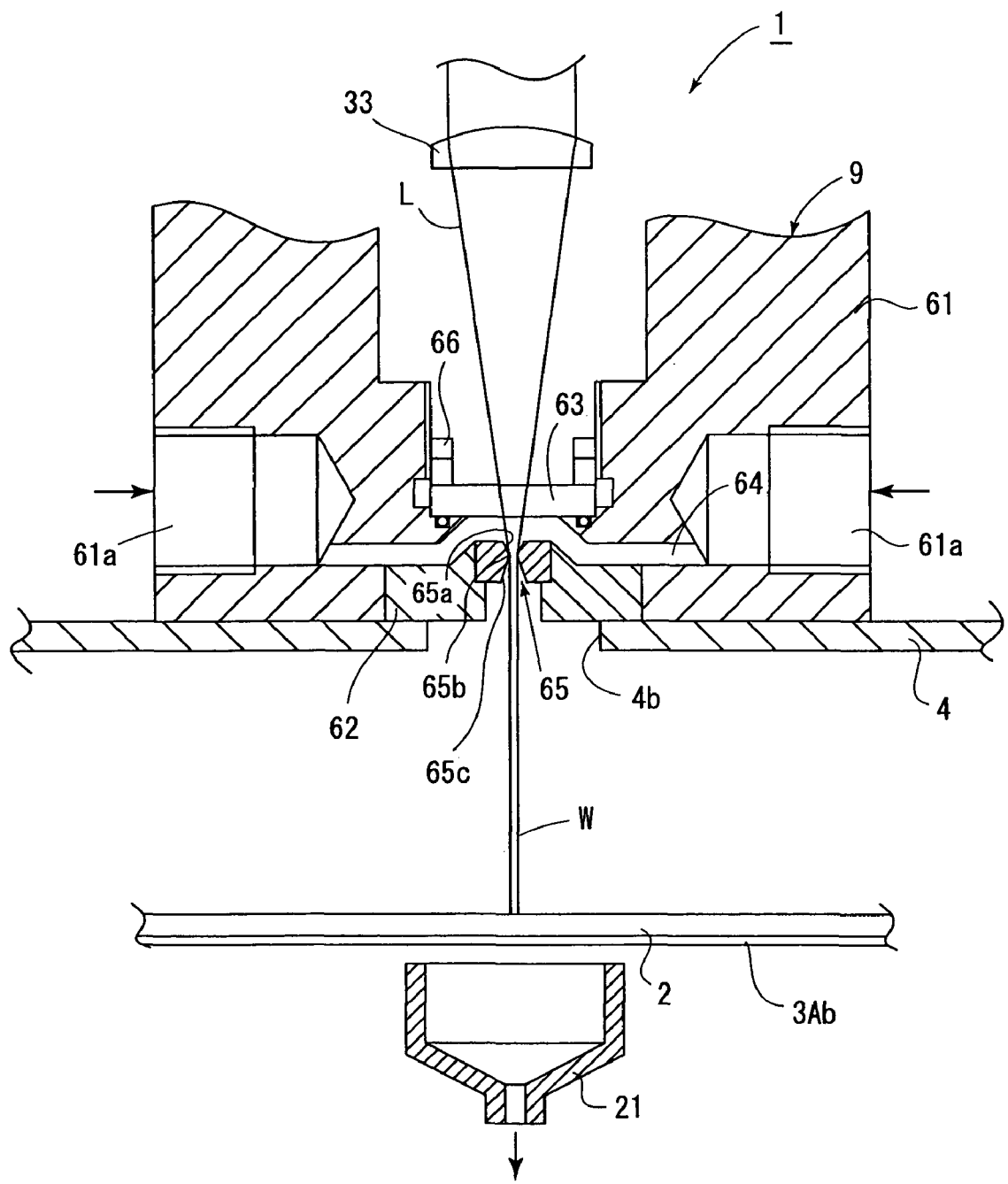
FIG. 2 is an enlarged diagram of a processing head.

The processing head 9, as shown in FIG. 2, includes: a housing 61 fixed to an upper surface of the chamber 4; a jet nozzle 62 held between the upper surface of the chamber 4 and the housing 61; and a transparent glass plate 63 provided between the jet nozzle 62 and the condensing lens 33.

In a side surface of the housing 61, a connection port 61a, which is connected to a liquid passageway 64 formed between the glass plate 63 and the jet nozzle 62 and is also connected to the above conduit 43, is provided, and water supplied from the liquid supply means 8 flows from the connection port 61a into the liquid passageway 64, and then is jetted from the jet nozzle 62 in the form of the liquid column W.

The jet nozzle 62 fits into the center of a lower end portion of the housing 61 and is held between the lower end portion of the housing 61 and the upper surface of the chamber 4, and a jet hole 65 is formed at the center of this jet nozzle 62.

This jet hole 65 has a first angled surface 65a, provided on the condensing lens 33 side, converging toward the workpiece 2 and a second angled surface 65c diverging from a minimum diameter portion 65b of the first angled surface 65a toward the workpiece 2 side.

In this embodiment, the diameter of the minimum diameter portion 65b can be 50 μm or less, and in this embodiment, specifically, the diameter of the minimum diameter portion 65b is 20 μm.

The glass plate 63 is located between the jet nozzle 62 and the condensing lens 33, and is secured to the housing 61 using a nut 66, preventing water in the liquid passageway 64 from leaking to a space above the glass plate 63, and also, it transmits the laser beam L condensed by the condensing lens 33.

Hereinafter, the operation of a hybrid laser processing apparatus 1 having such configuration will be described.

First, a door of the chamber 4 is opened, and the workpiece 2 is set on the processing table 3, and then the door is closed, thereby the inside of the chamber 4 being isolated in a state in which it is kept gas-tight against the external space.

Next, the controlling means controls the liquid supply means 8 to start sending water in the water storage tank 41 toward the processing head 9 by means of the liquid-sending pump 42. The water storage tank 41 is supplied with a sufficient amount of water by the water supply source 44 in advance.

The water sent by the liquid-sending pump 42, after passing through the check valve 47 and the third electromagnetic valve 48, flows into the accumulator 49, and the accumulator 49 is filled with the water and the high pressure water is supplied also to the processing head 9.

Upon the liquid passageway 64 being filled with the high pressure water as described above, the high pressure water is jetted from the jet hole 65 of the jet nozzle 62 in the form of the liquid column W, and reaches the workpiece 2.

However, the liquid column W jetted at this time will be disturbed by gas currents flowing around the jetted liquid column W because the inside of the chamber 4 is not in a vacuum state and, accordingly, it will diffuse before reaching the workpiece 2.

Upon the liquid column W being jetted, the drainage means 6 is also actuated, and aspirates water received by the catcher 21 via the workpiece 2 and the adhesive sheet 2B, and the water that has bounced off the workpiece 2 and accumulated at the bottom portion of the chamber 4, by means of the drainage pump 23 via the drain 22, and drains that to the outside. Specifically, providing the catcher 21 at the position where the liquid column W is jetted makes it possible to reduce the amount of vaporization in the chamber 4.

In parallel to the actuation of the liquid supply means 8, the controlling means controls the gas exhaust means 5 to first actuate the oil-sealed rotary pump 11 and open the first electromagnetic valve 14. As a result, the oil-sealed rotary pump 11 aspirates a gas in the chamber 4 via the gas exhaust hole 4a, lowering the gas pressure in the chamber 4, and a certain degree of vacuum state is thereby formed.

The controlling means actuates the diffusion pump 12 after a predetermined period of time has passed from the start of the oil-sealed rotary pump 11 actuation, or when the gas pressure in chamber 4 falls to a predetermined gas pressure or less.

Upon the start of the diffusion pump 12, the controlling means closes the first electromagnetic valve 14, and opens the second electromagnetic valve 15 instead, and then stops the oil-sealed rotary pump 11. Consequently, the diffusion pump 12 now aspirates the gas in the chamber 4 via the gas exhaust hole 4a, lowering the gas pressure in the chamber 4, and a higher degree of vacuum state is thereby formed.

Here, immediately after the actuation of the gas exhaust means 5, the liquid column W jetted from the processing head 9 vaporizes, and the inside of the chamber 4 has a high density of water vapor, but the oil-sealed rotary pump 11 having the characteristic of withstanding moisture exposure is preferable for this embodiment.

The controlling means actuates the diffusion pump 12 until the processing on the workpiece 2 is finished and, during that time, it maintains the vacuum state in the chamber 4.

As described above, as a result of bringing the inside of the chamber 4 into a vacuum state by means of the gas exhaust means 5, no gas flows around the liquid column W jetted from the jet hole 65, and the liquid column W reaches the workpiece 2 in a stable state without being disturbed by gas currents. By closing the third electromagnetic valve 48 thereafter, the high pressure water with no pulsation is jetted from the accumulator 49.

When the diameter of the minimum diameter portion 65b of the jet hole 65 is 20 μm as described in this embodiment, a stable liquid column W can be jetted by bringing the gas pressure in the chamber 4 into a vacuum state of approximately 100 hPa by means of the gas exhaust means 5. Also, if the gas pressure in the chamber 4 is brought into a vacuum state of approximately 10 hPa, a stable liquid column W can be jetted even when the diameter of the minimum diameter portion 65b is 5 μm.

The laser oscillator 7 starts operating by means of the controlling means in parallel to the operation of the gas exhaust means 5 and the liquid supply means 8, and the laser oscillator 7 starts oscillating the laser beam L.

However, the controlling means positions the reflective mirror 31a of the shutter means 31 on the optical path of the oscillated laser beam L, and the laser beam L is guided by the reflective mirror 31a to the damper 31b and the energy of the laser beam L is absorbed.

Then, when the inside of the chamber 4 is brought into a vacuum state, and the liquid column W jetted from the jet hole 65 reaches the workpiece 2 in a stable state in the chamber 4, the controlling means moves the reflective mirror 31a to the outside of the optical path of the laser beam L and, as a result, the laser beam L is condensed by the condensing lens 33 after it is reflected on the reflective mirror 32.

The condensed laser beam L passes through the glass plate 63 and the water in the liquid passageway 64, and then is reflected on the first angled surface 65a of the jet hole 65 and is guided into the liquid column W and, at this time, since the liquid column W has reached the workpiece 2 in a stable state, the laser beam L is then guided to the workpiece 2 while being repeatedly reflected within the liquid column W.

Meanwhile, if the jetted liquid column W is disturbed before it reaches the workpiece 2, the laser beam L cannot be repeatedly reflected within the liquid column W, which makes it impossible to guide the laser beam L to the workpiece 2 as a result of, for example, the laser beam L leaking to the outside on its way in the liquid column W.

According to the above embodiment, as a result of bringing the inside of the chamber 4 into a vacuum state by means of the gas exhaust means 5, the liquid column W can reach the workpiece 2 in a stable state without turbulence of the liquid column W, even through the liquid column W jetted from the jet hole 65 has a small diameter.

Also, conventionally, in order to stably jet the liquid column W, an air pocket is provided in a lower portion of the processing head 9 to make stable gas current flow around the jetted liquid column W, but in this embodiment, the inside of the chamber 4 is brought into a vacuum state, so that no air pocket is needed, and the jet nozzle 62 and the workpiece 2 can be made closer to each other by that amount.

Also, regarding the gas exhaust means 5, in this embodiment, two vacuum pumps, that is, the oil-sealed rotary pump 11 and the diffusion pump 12, are used for a vacuum pump, but the vacuum pump may include only one vacuum pump, that is, the oil-sealed rotary pump 11, depending on the diameter of the jetted liquid column W, and contrarily, it can also include three or more vacuum pumps.

The invention claimed is:

1. A hybrid laser processing apparatus including a processing head having a jet hole; liquid supply means for supplying the processing head with a high-pressure liquid; a laser oscillator for oscillating a laser beam; a condensing lens for condensing the oscillated laser beam; a chamber for enclosing at least a space formed between the processing head and a workpiece; and gas exhaust means for bringing the interior of the chamber into a vacuum state, wherein the apparatus performs processing on the workpiece by jetting a liquid supplied from the liquid supply means from the jet hole in the form of a liquid column and guiding the laser beam to the liquid column by the condensing lens, the jet hole comprises a first angled surface which is formed on a side on the condensing lens and converges toward the workpiece, a second angled surface which diverges toward the workpiece and the jet hole has a minimum diameter portion having a diameter of no more than 50 μm and the processing head is fixed to the upper surface of the chamber.

2. The hybrid laser processing apparatus according to claim 1, characterized by comprising drainage means including a catcher, provided below the workpiece, that receives a liquid that has penetrated the workpiece; and a drainage pump that aspirates the liquid in the catcher and drains it to the outside of the chamber.

* * * * *